United States Patent
Polzin et al.

(10) Patent No.: US 7,750,912 B2
(45) Date of Patent: Jul. 6, 2010

(54) INTEGRATING DISPLAY CONTROLLER INTO LOW POWER PROCESSOR

(75) Inventors: R. Stephen Polzin, San Jose, CA (US); Richard T. Witek, Austin, TX (US); Maurice B. Steinman, Marlborough, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 331 days.

(21) Appl. No.: 11/286,690

(22) Filed: Nov. 23, 2005

(65) Prior Publication Data

US 2007/0115290 A1    May 24, 2007

(51) Int. Cl.
G09G 5/36    (2006.01)
(52) U.S. Cl. ...................... 345/501; 345/520
(58) Field of Classification Search .................. 345/501
See application file for complete search history.

(56) References Cited

U.S. PATENT DOCUMENTS

| | | | |
|---|---|---|---|
| 5,390,350 A * | 2/1995 | Chung et al. | 713/322 |
| 5,640,545 A * | 6/1997 | Baden et al. | 345/545 |
| 5,657,055 A * | 8/1997 | Kansal et al. | 345/558 |
| 5,786,825 A | 7/1998 | Cain et al. | |
| 5,793,996 A * | 8/1998 | Childers et al. | 710/306 |
| 5,801,720 A | 9/1998 | Norrod et al. | |
| 5,949,423 A | 9/1999 | Olsen | |
| 5,991,883 A * | 11/1999 | Atkinson | 713/300 |
| 6,021,506 A * | 2/2000 | Cho et al. | 713/601 |
| 6,040,845 A | 3/2000 | Melo et al. | |
| 6,065,122 A * | 5/2000 | Wunderlich et al. | 713/320 |
| 6,208,273 B1 | 3/2001 | Dye et al. | |
| 6,226,012 B1 | 5/2001 | Priem et al. | |
| 6,239,808 B1 | 5/2001 | Kirk et al. | |
| 6,266,064 B1 | 7/2001 | Snyder | |
| 6,282,614 B1 | 8/2001 | Musoll | |
| 6,378,076 B1 | 4/2002 | Qureshi | |
| 6,647,501 B1 * | 11/2003 | Ninomiya | 713/320 |
| 6,684,321 B1 | 1/2004 | Falardeau | |
| 6,775,200 B1 | 8/2004 | Khan et al. | |
| 6,801,207 B1 | 10/2004 | Tischler et al. | |
| 6,820,209 B1 * | 11/2004 | Culbert et al. | 713/501 |

(Continued)

OTHER PUBLICATIONS

Thomas Pabst, "High-Tech and Vertex Juggling—NVIDIA's New GeForce3 GPU," Feb. 27, 2001, 16 pages.

(Continued)

*Primary Examiner*—Xiao M Wu
*Assistant Examiner*—Maurice McDowell, Jr.
(74) *Attorney, Agent, or Firm*—Lawrence J. Merkel; Meyertons, Hood, Kivlin, Kowert & Goetzel, P.C.

(57) ABSTRACT

In one embodiment, a system comprises a memory; a memory interface coupled to the memory; a processor unit coupled to the memory interface, a second interface coupled to the processor unit, and a graphics processing unit. The processor unit comprises at least one processor core and a display controller configured to couple to a display. The graphics processing unit is configured to render data into a frame buffer representing an image to be displayed on the display. The processor unit is configured to deactivate the second interface if the graphics processing unit is not rendering, and the display controller is configured to read the frame buffer data for display even if the second interface is deactivated.

17 Claims, 4 Drawing Sheets

U.S. PATENT DOCUMENTS

| | | |
|---|---|---|
| 6,924,810 B1 | 8/2005 | Tischler |
| 7,256,788 B1 * | 8/2007 | Luu et al. .................. 345/501 |
| 7,269,750 B1 * | 9/2007 | Garritsen et al. ............ 713/322 |
| 7,278,035 B2 * | 10/2007 | Chung et al. ................ 713/300 |
| 7,315,953 B2 * | 1/2008 | Su et al. ..................... 713/320 |
| 2003/0061457 A1 | 3/2003 | Geiger et al. |
| 2003/0131206 A1 | 7/2003 | Atkinson et al. |
| 2003/0135771 A1 * | 7/2003 | Cupps et al. ................ 713/320 |
| 2003/0153353 A1 * | 8/2003 | Cupps et al. ................ 455/556 |
| 2004/0139373 A1 * | 7/2004 | Brown ......................... 714/47 |
| 2004/0162922 A1 | 8/2004 | Kardach et al. |
| 2005/0128206 A1 | 6/2005 | Fujimoto |
| 2005/0268141 A1 * | 12/2005 | Alben et al. ................ 713/500 |

OTHER PUBLICATIONS

Alekey Berillo, "S3TC and FXT1 Texture Compression," Copyright by Digit-Life.com, 1997-2003, 21 pages.

"Geode™ GX1 Processor Series Low Power Integrated x86 Solution," National Semiconductor Corporation, Jun. 2002, 246 pages.

Ned Greene, Michael Kass, Gavin Miller, "Hierarchical Z-Buffer Visibility," Siggraph Conference Proceedings, Aug. 1993.

Kerby, Brent and Pabst, Thomas. Whitney, "Intel's 810 Chipset—Part 1," Apr. 30, 1999, Tom's Hardware, 14 pages.

Office Action from Chinese Application No. 200680043876.8, dated Nov. 26, 2009, 19 pages.

* cited by examiner

INTEGRATING DISPLAY CONTROLLER INTO LOW POWER PROCESSOR

BACKGROUND

1. Field of the Invention

This invention is related to the field of processors and computer systems including processors, and to managing power consumption in such systems.

2. Description of the Related Art

Various types of mobile computing devices have become very popular, permitting users to do useful work at various locations remote from their fixed computing stations. Mobile computing devices include portable computers (also referred to as laptops), personal digital assistants (PDAs) such as those based on the Palm operating system (e.g. the Palm Pilot family of devices) as well as those based on the Windows CE platform, mobile communications devices such as the Blackberry line of products from Research in Motion, which provide wireless email access, and various wireless telephony devices such as cell phones, combinations of PDAs or Blackberries and cell phones, etc.

A common issue for all mobile computing devices is battery life. The longer the battery (or a given charge of the battery) can be made to last, the more satisfied the user is with the product and thus the more likely the user is to purchase their next product from the same manufacturer. Many mobile computing devices, especially laptops, may also be connected to an external power source (e.g. an A/C wall outlet) in addition to having an internal battery power source. When using an external power source, the battery is not used (and may in fact be charged from the external power source). Thus, higher power consumption may be permissible when using the external power source. Numerous power saving features have been implemented in various computing devices (e.g. the Advanced Configuration and Power Interface (ACPI) is frequently used in laptops). However, striving for improved battery life when the mobile computing device is not connected to an external power source is still an area of high interest and continuing innovation.

SUMMARY

In one embodiment, a system comprises a memory; a memory interface coupled to the memory; a processor unit coupled to the memory interface, a second interface coupled to the processor unit, and a graphics processing unit. The processor unit comprises at least one processor core and a display controller configured to couple to a display. The graphics processing unit is configured to render data into a frame buffer representing an image to be displayed on the display. The processor unit is configured to deactivate the second interface if the graphics processing unit is not rendering, and the display controller is configured to read the frame buffer data for display even if the second interface is deactivated.

In an embodiment, a processor unit comprises at least one processor core, a display controller configured to couple to a display, and a bridge coupled to the processor core and the display controller. The bridge is further configured to couple to a second interface to communicate with a graphics processing unit. The graphics processing unit is configured to render data into a frame buffer representing an image to be displayed on the display. The bridge unit can be configured to deactivate the second interface if the graphics processing unit is not rendering, and wherein the display controller is configured to read the frame buffer data for display even if the second interface is deactivated.

In another embodiment, an integrated circuit comprises at least one processor core and a display controller configured to couple to a display. The display controller is configured to read data from a frame buffer, the data representing an image. Additionally, the display controller is configured to cause the display to display the image. The integrated circuit excludes a graphics processing unit that renders the image into the frame buffer.

BRIEF DESCRIPTION OF THE DRAWINGS

The following detailed description makes reference to the accompanying drawings, which are now briefly described.

Figure 1:
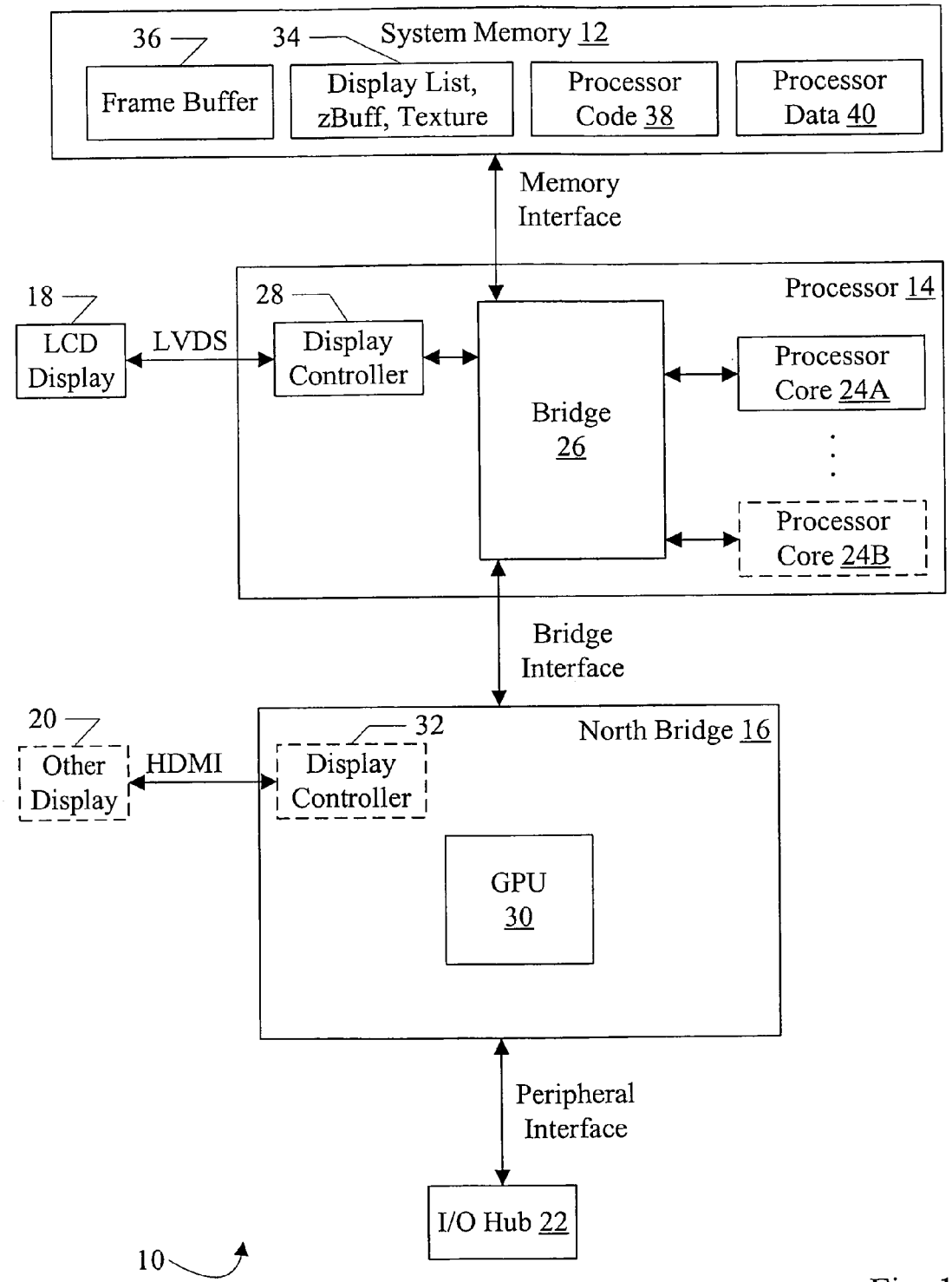
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of a portion of a computer system 10 is shown. In the illustrated embodiment, the system 10 includes a system memory 12, a processor unit 14, a north bridge 16, a liquid crystal display (LCD) display 18, an optional other display 20, and an input/output (I/O) hub 22. The processor unit 14 includes at least one processor core (e.g. processor core 24A and optional processor core 24B in the illustrated embodiment), a bridge 26, and a display controller 28. The north bridge 16 includes a graphics processing unit 30 and an optional display controller 32. The processor unit 14 (and more particularly, the bridge 26 in the illustrated embodiment) is coupled to a memory interface to communicate with the system memory 12. The display controller 28 is coupled to an interface (e.g. the low voltage differential signalling (LVDS) interface in the illustrated embodiment) to the display 18, and is further coupled to the bridge 26. The bridge 26 is further coupled to the processor cores 24A-24B, and to a bridge interface to the north bridge 16. The display controller 32 is coupled to an interface (e.g. the high definition multimedia interface (HDMI)) to the display 20. The north bridge 16 is further coupled to a peripheral interface to the I/O hub 22.

The computer system 10 may be part of a mobile computing device (e.g. a laptop, PDA, etc.). The display 18 may be the display that is integrated into the mobile computing device. For example, the mobile computing device may comprise a housing into which the display and the computer system 10 are integrated. In a laptop, the display may be included in the "lid" that can be opened to expose the keyboard. In PDAs, the display is often on the front of the mobile computing device.

The display 18 may comprise a relatively low power display, in some embodiments, designed to optimize battery life. For example, as illustrated in FIG. 1, the display 18 may be an LCD. Other embodiments may have a thin film transistor (TFT) display, or any other display that may be integrated into the device. On the other hand, the display 20 may be a relatively high power display such as a cathode ray tube (CRT) display, an LCD or TFT display, or a plasma display or other display in a standalone unit separate from the laptop and connected via an external connector such as a video out, TV out, or dock connection. The display 20 may generally be used when the mobile computing device is provided with external power, and thus battery life may not be a concern.

The GPU 30 and the display controller 28 (and the display controller 32, if included) may cooperate to provide for the display of objects generated by various software (e.g. software executing on the processor cores 24A-24B) on the display 18 (and the display 20). Generally, the software may create data structures in the system memory 12 representing the objects to be displayed. The data structures are illustrated at reference numeral 34. The GPU 30 may read the data structures and process them, generating pixel data representing each pixel on the display. Processing the data structures representing objects to be displayed and generating image data (e.g. pixel data) is referred to as rendering the image. The pixel data may describe, e.g., the color of the corresponding pixel on the display. The GPU 30 may write the pixel data to a frame buffer (reference numeral 36) in the system memory 12. Thus, the frame buffer 36 may comprise data representing the image to be displayed on the display 18 or 20. The display controllers 28 or 32 may read the frame buffer 36 from the system memory 12, and may generate controls to the displays 18 or 20 to display the image described in the frame buffer 36. In the embodiment of FIG. 1, the GPU 30 accesses memory by generating read/write commands which are transmitted over the bridge interface. The commands are received by the bridge 26, which routes corresponding commands to the system memory 12. Similarly, the display controller 32 may generate read commands to read the frame buffer 36, which may be transmitted on the bridge interface to the bridge 26, which may route corresponding commands to the system memory 12. On the other hand, the display controller 28 may read the frame buffer 36 by generating commands for the system memory 12, which are conveyed by the bridge 26.

The displays 18 or 20 may generally not include memory to store the image being displayed, and thus are refreshed repeatedly to continue displaying the image, even if the image is static (i.e. not changing). The rate at which the image is re-transmitted for display is referred to as the refresh rate. The refresh rate may be user selectable and may vary, e.g., from 60-120 Hertz (Hz) in typical displays. Thus, the display controller 28 or 32 may read the frame buffer data repeatedly to retransmit to the displays 18 or 20 (e.g. 60-120 times per second for typical displays).

In many cases, the GPU 30 is idle a relatively large percentage of the time that the system 10 is in operation (e.g. on the order of 90%). That is, the image being displayed is static for a large percentage of the time, and the GPU 30 is thus not rendering during such times. However, the display controllers 28 and 32 are not idle during these times, as they refresh the displays 18 and 20 with the image.

Since the display 18 is part of the mobile computing device in the present embodiment, the display 18 may be used during times that the device is operating on battery power. Accordingly, by integrated the display controller 28 into the processor unit 14, the refresh of the display 18 by the display controller 28 may be performed over the memory interface and the LVDS interface. Particularly, the refresh of the display 18 may be performed without any transactions on the bridge interface to the north bridge 16.

Thus, during times that rendering is not occurring, the system 10 may deactivate the bridge interface. More specifically, the processor unit 14 (e.g. the bridge 26) may deactivate the bridge interface. Power that would otherwise be expended in operating the bridge interface may be conserved, which may extend battery life in some embodiments. The manner in which the interface is deactivated may vary from embodiment to embodiment, depending on the nature of the interface itself. Generally, deactivating the interface may refer to stopping transmission on the interface.

In one embodiment, the bridge interface may be compatible with the HypertTransport™ (HT) interface. The HT interface is a high speed, clock forwarded interface. Accordingly, even when no transactions are being communicated over the HT interface, idle data patterns are transmitted and the clock continues to run. Deactivating the HT interface may comprise performing a disconnect (which provides an orderly shutdown of the HT interface on both ends of the interface). After disconnecting, the clock for the HT interface may be stopped. Subsequently, the interface may be reconnected to perform communications between the processor unit 14 and the north bridge 16.

Other interfaces may be deactivated for the purpose of reducing power consumption in other ways. For example, a shared bus interface may be deactivated simply by gating the clock that corresponds to the bus interface. Alternatively, the signals of an interface may be driven to inactive (deasserted) levels. Any mechanism for ceasing transmission on the interface may be used.

Furthermore, the GPU 30 may be a high performance processor which may be implemented in a relatively large number of transistors (e.g. rivaling the order of magnitude of transistor counts in a processor core 24A-24B). Accordingly, by having the GPU 30 remain in the north bridge 16 and integrating the display controller 28 into the processor unit 14, power conservation may be achieved while still permitting freedom for the GPU 30 to evolve unconstrained by power/area constraints in the processor unit 14 and without constraining the processor cores 24A-24B as well, in some embodiments. Still further, various embodiments of the system 10 may use different GPUs 30 with the same processor unit 14. In other embodiments, the GPU 30 may be fixed function logic, a programmable logic device, or a combination of one or both and the processor described above.

If the display controller 32 is in use (and thus there is a display 20 coupled to the system 10), the bridge interface may not be deactivated because the display controller 32 would not be able to access the system memory 12. However, if the display controller 32 is in use, typically the system 10 is being supplied from an external supply and thus battery life may not be an issue. Examples of times that the display controller 32 may be in use include a laptop connected to a docking station, or a laptop being used in presentation mode where a projector is connected to the VGA output of the laptop.

The data structures 34 may be defined in any desired fashion, and may vary from embodiment to embodiment of the GPU 30. The data structures may in some way include a display list of the objects to be displayed. For example, in some embodiments, the display list may comprise triangles to be drawn into the image. The depth of each object in the image may also be specified, so that the GPU 30 may determine, when objects overlap, which objects are in front of other objects (e.g. zBuff in FIG. 1). Furthermore, the data structures may specify textures to be applied to the objects in various texture maps. Many other fashions for describing the objects may be used, including varying levels of complexity and any desired format, in various embodiments.

The north bridge 16 may further be coupled to an I/O hub 22 or I/O device(s) via a peripheral interface. In one embodiment, the peripheral interface may also be an HT interface. Alternatively, the peripheral interface may be any other communication interface (e.g. peripheral component interconnect (PCI), in its various forms, universal serial bus (USB), IEEE 1394 "Firewire", serial or parallel interfaces, etc. The I/O hub 22 may connect to I/O devices, or may bridge to another desired peripheral interface, to which I/O devices may be coupled. Alternatively, one or more I/O devices may couple to the north bridge 16 via the peripheral interface.

Accordingly, in the embodiment of FIG. 1, the bridge interface may be reactivated if either there is rendering for the GPU 30 to perform, or if there is I/O activity on the peripheral interface or directed to the peripheral interface. The peripheral interface may be deactivated as well if the bridge interface is deactivated, in some embodiments.

The processor cores 24A-24B may implement any desired instruction set architecture. For example, the processor cores 24A-24B may implement the x86 instruction set architecture (also referred to as IA-32). The processor cores 24A-24B may implement the AMD64™ instruction set architecture. Other exemplary instruction set architectures include the PowerPC™ instruction set architecture, the ARM™ instruction set architecture, the SPARC™ instruction set architecture, the MIPS™ instruction set architecture, etc. In some embodiments, only one processor core may be included. In other embodiments, two or more processor cores may be include in a multi-core configuration.

The bridge 26 may generally be responsible for communicating between the bridge interface, the display controller 28, the processor cores 24A-24B, and the system memory 12. Thus, the bridge 26 may incorporate memory controller functionality to control the system memory 12. The memory interface may comprise any standard memory interface (e.g. the system memory 12 may comprise synchronous dynamic random access memory (SDRAM) modules and the memory interface may be an SDRAM interface). Any type of SDRAM memory may be used (e.g. single data rate, double data rate (DDR), DDR2, etc.). Generally, any type of semiconductor memory may be used as the system memory 12, in various embodiments. For example, RAMBUS DRAM (RDRAM), static RAM, etc. may be used.

In the illustrated embodiment, the system memory 12 is a unified memory configuration, in which the system memory 12 is shared by both the graphics units (e.g. the data structures 34 and the frame buffer 36) and by the processor cores 24A-24B. For example, the processor code 38 executed by the processor cores 24A-24B and the data 40 accessed/updated by the processor cores 24A-24B in response to executing the code 38 are stored in the system memory 12 as well. In some embodiments, integrating the display controller 28 into the processor unit 14 and deactivating the bridge interface to conserve power may eliminate or substantially reduce the battery life cost that may be experienced in a unified memory design and still retain the connection of the system memory 12 to the processor unit 14, which has performance advantages for the processor cores 24A-24B.

The processor unit 14 may generally comprise any apparatus incorporating at least one processor core and other components. In one embodiment, the processor unit 14 may comprise a single integrated circuit chip. In other embodiments, the processor unit 14 may comprise two or more chips in a multi-chip module, two or more discrete integrated circuits coupled to a circuit board, etc. Similarly, the north bridge 16 may comprise a bridge unit, which may be a single integrated circuit chip, two or more chips in a multi-chip module, two or more discrete integrated circuits coupled to a circuit board, etc.

Figure 2:
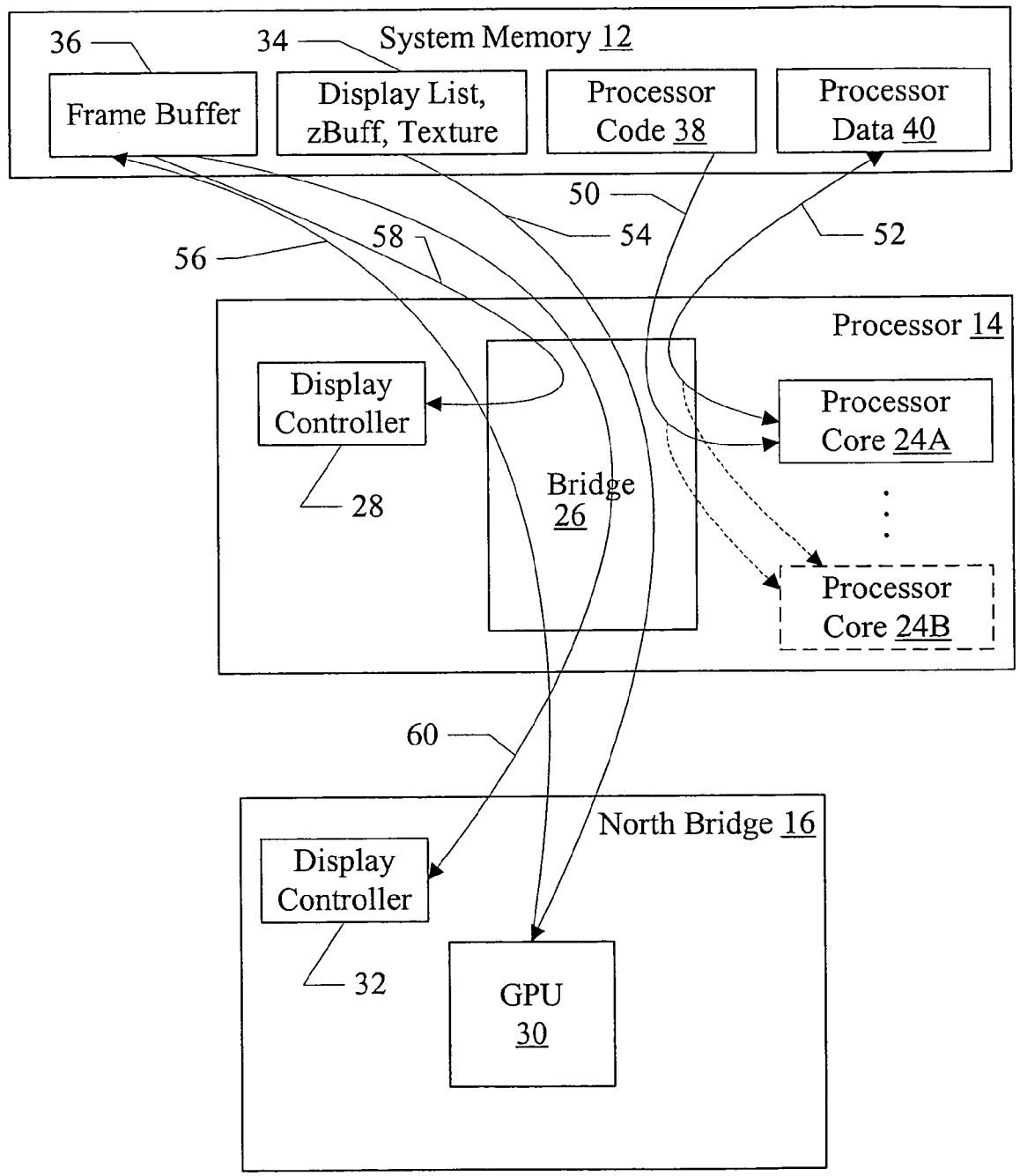
FIG. 2 is a block diagram illustrating data flow in the computer system for one embodiment.

FIG. 2 is a block diagram of various components of the system 10 shown in FIG. 1, illustrating certain data flow between the components for one embodiment. The processor cores 24A-24B may read the processor code 38 from the system memory 12 (arrow 50), and may read and write the data 40 (arrow 52). Additionally, the processor cores 24A-24B may read and write the data structure 34 to add/delete objects to be displayed. The GPU 30 may read the data structures 34 (arrow 54) and may write the generated image data to the frame buffer 36 (arrow 56). The display controllers 28 and 32 may read the frame buffer 36 (arrows 58 and 60, respectively).

As FIG. 2 illustrates, if the display controller 32 is inactive (which may be the case for the mobile computing system being used on battery supply) and if the GPU 30 is not rendering (as is the case for a large percentage of the time), the interface to the north bridge 16 may be deactivated while still refreshing the local display via the display controller 28.

Figure 3:
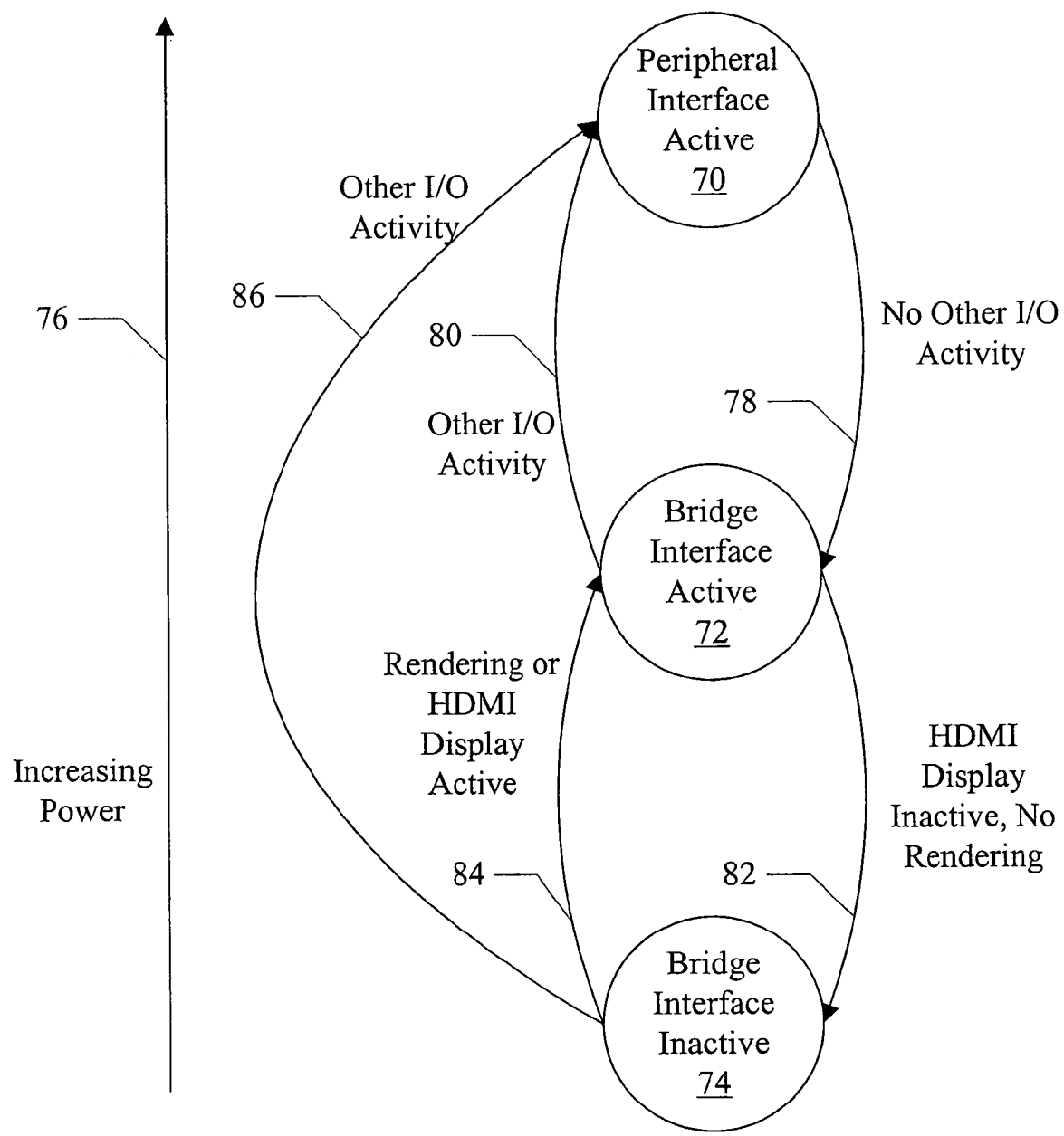
FIG. 3 is a state diagram illustrating various power states of a processor unit shown in FIGS. 1 and 2.

FIG. 3 illustrates a state machine including various states that may be implemented with regard to the system shown in FIG. 1, for one embodiment. The states are arranged vertically, with generally increasing power consumption occurring in the upward direction as shown in FIG. 3 (arrow 76). That is, power consumption in the peripheral interface active state 70 may be higher than the power consumption in the bridge interface active state 72, which may be higher than the power consumption in the bridge interface inactive state 74. In some embodiments, if the system 10 is receiving power from an external source, the state machine may remain in the peripheral interface active state 70.

In the peripheral interface active state 70, both the peripheral interface and the bridge interface are active. Any I/O activity and/or rendering activity may occur in the peripheral interface active state 70. If there is no current I/O activity (except for graphics activity—arc 78), the state machine may transition to the bridge interface active state 72, and the system may deactivate the peripheral interface. Resumption of I/O activity (arc 80) may cause a transition back to the peripheral interface active state 70 and reactivation of the peripheral interface.

In the bridge interface active state 72, if the HDMI display is inactive (that is, display controller 32 is inactive) and no rendering is being performed by the GPU 30, the system may transition to the bridge interface inactive state 74 and the system may deactivate the bridge interface (arc 82). The display controller 32 may include an enable bit or other enable controls indicating whether or not the display controller 32 is active. The system may detect that rendering in not being performed if the GPU 30 is idle.

In the bridge interface inactive state 74, if rendering is being performed or the HDMI display (display controller 32) is activated, the system may reactivate the bridge interface and transition to the bridge interface activate state 72 (arc 84). The system may detect that rendering is to be performed if the data structure 34 is changed, if a write to a given register in the bridge 26 is detected, if a command that signals the GPU 30 to commence rendering is detected, etc. If other (non-graphics) I/O activity is detected (arc 86), both interfaces may be reactivated and the state machine may transition to the peripheral interface activate state 70.

Other embodiments of the state machine may exclude the peripheral interface active state 70. In some embodiments, the state machine shown in FIG. 3 may be included in a larger power management scheme (e.g. ACPI). In one embodiment, for example, the bridge interface inactive state 74 may correspond to an Idle state in ACPI.

Figure 4:
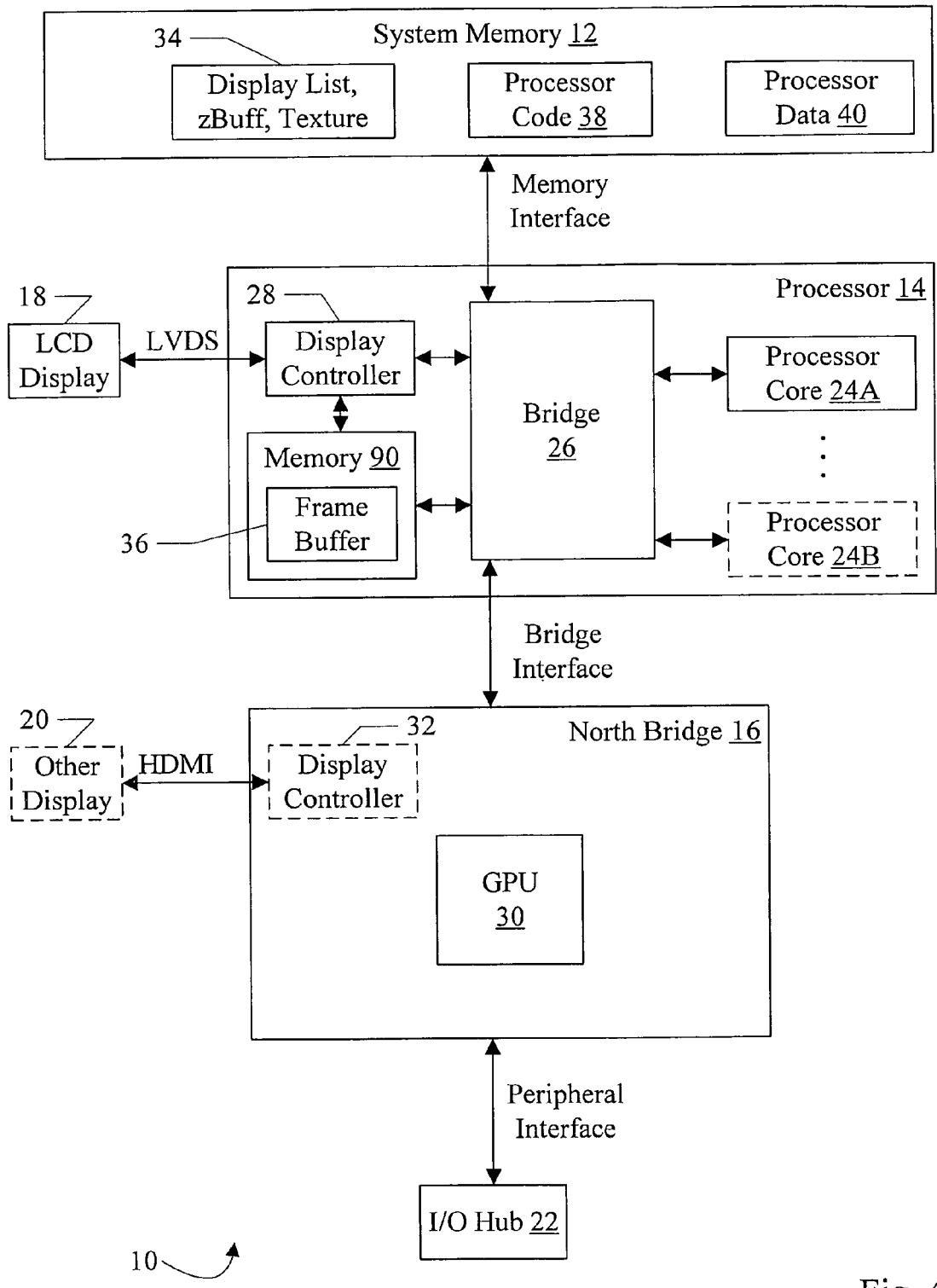
FIG. 4 is a block diagram of another embodiment of a computer system.

Turning now to FIG. 4, a block diagram of another embodiment of the computer system 10 is shown. The computer system 10 in FIG. 4 may be similar to the computer system 10 shown in FIG. 1, and like elements are numbered in the same way in FIG. 4 as compared to FIG. 1. In the embodiment of FIG. 4, the processor unit 14 also includes a memory 90 which stores the frame buffer 36 (instead of the system memory 12). In the embodiment of FIG. 4, even the memory interface may be deactivated and the display controller 28 may refresh the display 18 from the memory 90 (e.g. in the state 74 shown in FIG. 3). Still more power consumption savings may be realized in some embodiments.

The memory 90 may comprise any type of semiconductor memory. For example, the memory 90 may comprise embedded DRAM, if the processor unit 14 is a single integrated circuit, or local DRAM in the processor unit 14 in other embodiments. The memory 90 may also be SRAM.

In one embodiment, the memory 90 may be mapped into the same address space as the system memory 12. In such an embodiment, the memory 90 may automatically be written when the GPU 30 generates writes to the addresses allocated to the frame buffer 36. In other embodiments, the memory 90 may be operated as a cache. The frame buffer 36 may also be stored in the system memory 12, and the memory 90 may be maintained coherent with the system memory 12 or may be periodically reloaded from the system memory 12 if rendering is actively being performed.

Numerous variations and modifications will become apparent to those skilled in the art once the above disclosure is fully appreciated. It is intended that the following claims be interpreted to embrace all such variations and modifications.

What is claimed is:

1. A system comprising:
   a memory;
   a memory interface coupled to the memory;
   a processor unit coupled to the memory interface, wherein the processor unit comprises at least one processor core, a display controller configured to couple to a display, and a bridge coupled to the processor core, the display controller, and the memory interface, wherein memory requests from the display controller are routed to the memory through the bridge, and wherein memory requests from the processor core are routed to the memory through the bridge;
   a second interface coupled to the bridge in the processor unit; and
   a graphics processing unit configured to render data into a frame buffer stored in the memory, the frame buffer representing an image to be displayed on the display, wherein a first path from the graphics processing unit to the memory includes the second interface, and wherein memory requests from the graphics processing unit are routed on the second interface to the bridge and from the bridge to memory;
   wherein the processor unit is configured to deactivate the second interface if the graphics processing unit is not rendering, and wherein the display controller is configured to read the frame buffer data for display even if the second interface is deactivated, and wherein a second path from the display controller to the memory excludes the second interface, and wherein a third path from the processor core to the memory excludes the second interface.

2. The system as recited in claim 1 wherein the graphics processing unit is configured to access memory by initiating commands over the second interface to the processor unit, which is configured to access memory over the memory interface.

3. The system as recited in claim 2 wherein the graphics processing unit is configured to read data describing objects to be rendered from the memory, and wherein the graphics processing unit is configured to write the image to the frame buffer.

4. The system as recited in claim 1 wherein the memory stores instructions and data accessed by the processor core during use.

5. The system as recited in claim 4 wherein the processor unit further comprises a second memory that stores the frame buffer.

6. The system as recited in claim 1 further comprising a second display controller configured to couple to a second display, wherein the second display controller is coupled to communicate over the second interface.

7. The system as recited in claim 6 wherein the display coupled to the display controller in the processor unit is integrated into a housing with the system.

8. The system as recited in claim 7 wherein the second display is a separate component coupled to the system.

9. The system as recited in claim 1 wherein the graphics processing unit is included in a second bridge that is coupled to the second interface and is further coupled to a peripheral interface.

10. The system as recited in claim 9 wherein the processor unit is configured to deactivate the second interface if the graphics processing unit is not rendering and there is no activity on the peripheral interface.

11. The system as recited in claim 1 wherein the processor unit is a single integrated circuit.

12. A processor unit comprising:
    at least one processor core;
    a display controller configured to couple to a display; and
    a bridge coupled to the processor core and the display controller, wherein the bridge is further configured to couple to a second interface to communicate with at least: (i) a graphics processing unit that is configured to render data into a frame buffer stored in memory, the frame buffer representing an image to be displayed on the display, and (ii) one or more peripheral devices;
    wherein the bridge unit is configured to deactivate the second interface if the graphics processing unit is not rendering and there is no outstanding communication activity to the one or more peripheral devices, and wherein the display controller is configured to read the frame buffer data for display even if the second interface is deactivated.

13. The processor unit as recited in claim 12 wherein processor core is configured to access data and instructions from a memory during use, wherein the memory is coupled to a memory interface to which the processor core is also coupled during use.

14. The processor unit as recited in claim 12 wherein the one or more peripheral devices are coupled to a peripheral interface to which a second bridge is coupled, and wherein the second bridge is coupled to the second interface and comprises the graphics processing unit.

15. The processor unit as recited in claim 12 wherein the processor unit is a single integrated circuit.

16. An integrated circuit comprising:
    at least one processor core;

a bridge coupled to the processor core and configured to couple to a memory interface to which a memory is coupled during use, wherein the memory stores instructions to be executed by the processor core during use, and wherein the processor core is configured to transmit fetch requests for the instructions to be executed through the bridge to memory; and a display controller configured to couple to a display, wherein the display controller is configured to read data from a frame buffer, the data representing an image, and wherein the display controller is configured to cause the display to display the image, wherein the frame buffer data is stored in the memory during use, and wherein the display controller is coupled to the bridge and is configured to read the frame buffer data through the bridge from memory; and wherein the integrated circuit excludes a graphics processing unit that renders the image into the frame buffer, and wherein the bridge is configured to couple to an interface to communicate with the graphics processing unit external to the integrated circuit, and wherein the integrated circuit is configured to deactivate the interface if the graphics processing unit is not rendering, and wherein the display controller is configured to read the frame buffer to display the image even when the interface is deactivated.

17. The integrated circuit as recited in claim 16 further comprising a second memory coupled to the display controller, wherein the second memory is also configured to store the frame buffer data, and wherein the display controller is configured to read the data from the second memory if the frame buffer data is stored in the second memory, and wherein the display controller is configured to read the frame buffer data from the memory if the frame buffer data is not stored in the second memory.

* * * * *